United States Patent
Toskala et al.

(10) Patent No.: US 6,535,503 B1
(45) Date of Patent: Mar. 18, 2003

(54) CHANNEL ALLOCATION METHOD AND RADIO SYSTEM USING A COMBINATION OF TDMA AND CDMA

(75) Inventors: Antti Toskala, Helsinki (FI); Harri Holma, Espoo (FI); Riku Pirhonen, Helsinki (FI)

(73) Assignee: Nokia Telecommunications, Espoo (FI)

(*) Notice: Subject to any disclaimer, the term of this patent is extended or adjusted under 35 U.S.C. 154(b) by 0 days.

(21) Appl. No.: 09/269,710

(22) PCT Filed: Oct. 14, 1997

(86) PCT No.: PCT/FI97/00625

§ 371 (c)(1),
(2), (4) Date: Jun. 2, 1999

(87) PCT Pub. No.: WO98/17077

PCT Pub. Date: Apr. 23, 1998

(30) Foreign Application Priority Data

Oct. 15, 1996 (FI) .................................................. 964138

(51) Int. Cl.⁷ .................................................. H04J 3/24
(52) U.S. Cl. .................. 370/349; 370/337; 370/353; 370/468; 370/335
(58) Field of Search ................................. 370/336, 345, 370/338, 352, 353, 347, 468, 328, 330, 337, 342, 349; 375/131

(56) References Cited

U.S. PATENT DOCUMENTS

| | | | | |
|---|---|---|---|---|
| 4,761,781 A | * | 8/1988 | Calvignac et al. | 370/94 |
| 5,392,280 A | * | 2/1995 | Zheng | 370/60 |
| 5,533,019 A | * | 7/1996 | Jayapalan | 370/60.1 |
| 5,862,132 A | * | 1/1999 | Blanchard et al. | 370/342 |
| 6,343,071 B1 | * | 1/2002 | Lansford | 370/338 |

FOREIGN PATENT DOCUMENTS

| | | |
|---|---|---|
| GB | 2 285 900 | 7/1995 |
| GB | 2 293 947 | 4/1996 |
| JP | 6268575 | 9/1994 |

OTHER PUBLICATIONS

VTC '96, Apr. 28–May 1, 1996. Atlanta, GA USA Mobile Technology for the Human Race IEEE CTS 46 Vehicular Technology Conference Proceedings vol. 1 A critical review of CDMA Paul walter Baier, pp. 6–10.

* cited by examiner

Primary Examiner—Thanh Cong Le
Assistant Examiner—Lana Le
(74) Attorney, Agent, or Firm—Pillsbury Winthrop LLP

(57) ABSTRACT

A radio system and a channel allocation method in a radio system are provided. The radio system and method have at least one base station communicating with terminals within a coverage area thereof. Air interface resources are allocated to different terminals with a combined time and code multiple access method such that the signal of one or more terminals is transmitted in each time slot. Terminal signals are grouped into different time slots based on connection characteristics of each terminal.

13 Claims, 2 Drawing Sheets

CHANNEL ALLOCATION METHOD AND RADIO SYSTEM USING A COMBINATION OF TDMA AND CDMA

The present invention relates to a channel allocation method in a radio system comprising at least one base station communicating with terminals within its coverage area, some of the terminals using discontinuous transmission, and in which method air interface resources are allocated to different terminals with a combined time and code division multiple access method in such a way that a signal of one or more terminals is transmitted in each time slot.

DESCRIPTION OF THE PRIOR ART

One of the most essential problems in planning and implementing radio systems is the efficient use of frequency. As the volume of radio traffic is continuously on the increase, this problem has become more and more important. The more efficiently a system can utilize a given frequency band, the greater is the potential number of users of the system. When new radio systems are developed, the multiple access methods of air interface are a central field of research.

Thus the aim of multiple access methods is to use frequency, in other words air interface resources, as efficiently as possible. As the number of users increases, the most important factor that restricts the capacity is co-channel interference, and as a consequence the way how users are grouped into different channels becomes crucial to maximizing the capacity. Specifically in mobile communication systems the problem is on one hand the mobility of users, which gives rise to geographically varying needs of capacity, and on the other hand the environmental differences in view of the propagation of radio waves, and the multipath propagation, which cause slow and fast changes in signal strength. Thus a multiple access method must be applicable under the influence of random factors in a way which enables the division of channels between users advantageously in view of the whole system.

In frequency division multiple access (FDMA), users are separated from one another by frequency; a separate frequency band is allocated to the data signal of each user. In time division multiple access (TDMA) the frequency band is divided into successive time slots, and the data signal of each user is transmitted in a separate, repetitive time slot. A plurality of frequency bands like this can be in use, in which case the method is called a combined FDMA/TDMA. In a conventional TDMA system, when a transmitter is powerful, the same time slot cannot be used in adjacent cells due to co-channel interference, even though the aim is to limit the average transmission power by using discontinuous transmission. The problem has been solved by adopting a reuse pattern according to which a common frequency is not used in adjacent cells. However, this is inefficient as to the use of frequencies. Furthermore, the decrease in the average interference level caused by discontinuous transmission cannot be fully utilized to reduce the reuse configuration, since the reuse configuration is determined to a great extent by the peak value of the co-channel interference caused by one user.

Code division multiple access (CDMA) is a multiple access method based on a spread-spectrum technique. In conventional CDMA, a narrowband data signal of the user is modulated by a spreading code with a broader bandwidth than that of the data signal onto a relatively broad band. The spreading code comprises a plurality of bits. The bit speed of the spreading code is much higher than that of the data signal, and in distinction from the data bits and data symbols the spreading code bits are called chips. Each data symbol of the user is multiplied by all spreading code chips. Each user of the same cell has a separate spreading code. Several users transmit simultaneously on the same frequency band, and data signals are distinguished from one another at receivers on the basis of the spreading code. In CDMA systems the power adjustment of transmitters is assumed to function optimally in disturbance control. Users operating on different power levels are on the same frequency band and the function of power adjustment is critical to the system. Further, it is difficult to use great power differences in downlink transmission.

The method of the invention can be applied to radio systems specifically those employing a combined TDMA/CDMA method. Hence the air interface resources are divided in such a way that a channel consists of successive time slots transmitting the signals of one or more terminals, which signals are multiplied each by a separate spreading code, which may be one or more. FDMA can also be included in the method, in which case several different frequencies, each employing the combined TDMA/CDMA method, are in use. The combined TDMA/CDMA method is described in greater detail in Baier P. W, *A Critical Review of CDMA, Proceedings of VTC96*, pp. 6–10.

BRIEF DESCRIPTION OF THE INVENTION

The aim of the present invention is to implement a method for multiple access and channel allocation by which the effects of random factors can be averaged efficiently, and which is easily adaptable in different operating and environmental circumstances.

This is achieved with a method set forth in the preamble, which is characterized in that terminal signals are grouped into different time slots on the basis of the connection characteristics of each terminal in such a way that signals of terminals employing discontinuous transmission are grouped into the same time slots and transmissions of terminals employing continuous transmission into time slots of their own.

The invention also relates to a channel allocation method in a radio system comprising at least one base station communicating with terminals within its coverage area, and which system comprises both circuit switched services and packet switched services, and in which method air interface resources are allocated to different terminals with a combined time and code multiple access method in such a way that the signal of one or more terminals is transmitted in each time slot. The channel allocation method according to the invention is characterized in that the terminal signals are grouped into different time slots on the basis of the connection characteristics of each terminal in such a way that the signals of terminals employing circuit switched services are grouped into the same time slots, and the transmissions of terminals employing packet switched services into time slots of their own.

The invention further relates to a radio system comprising at least one base station communicating with terminals within its coverage area, and employing a combined time and code division multiple access method in such a way that the signals of one or more terminals are transmitted in each time slot, and in which system some of the terminals are fixed and others mobile. The radio system according to the invention is characterized in that the terminal signals are grouped into different time slots on the basis of the connection characteristics of each terminal in such a way that the signals of fixed terminals are grouped into the same time slots and the transmissions of mobile terminals into time slots of their own.

Several advantages are achieved with the method of the invention. By grouping the terminals into different time slots in accordance with their power levels, co-channel interference can be decreased. As a consequence of this the reuse configuration can be reduced, which allows easier cellular planning and more efficient utilization of the frequency spectrum. The reduction in power level changes within one time slot also enables an improvement in the reliability of interference level measurements of the channel.

The method of the invention can thus be applied to TDMA/CDMA systems, and to systems which, in addition to the aforementioned, also comprise FDMA, that is to say a plurality of frequency channels. Hence in time slot allocation the availability of an adjacent channel can be considered depending on whether low or high power users are allocated to the time slot. Furthermore, the invention can be applied to both FDD (Frequency Division Duplex) and TDD (Time Division Duplex) methods.

DESCRIPTION OF THE DRAWINGS

In the following the invention will be described in greater detail with reference to the examples in accordance with the attached drawings, in which.

DESCRIPTION OF THE PREFERRED EMBODIMENTS

Figure 1:
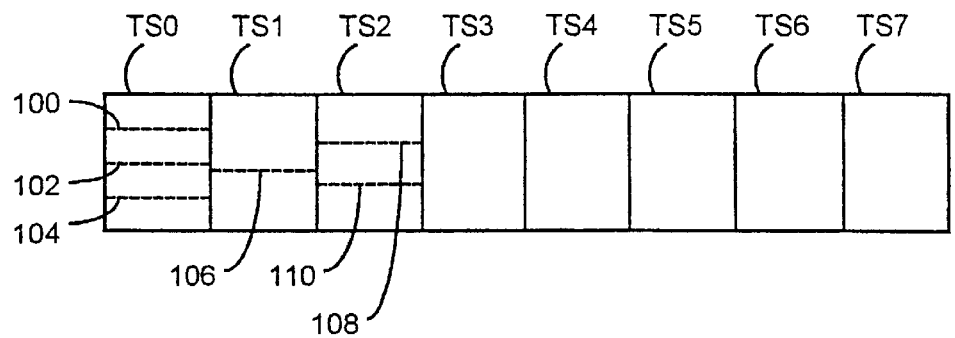
FIG. 1 illustrates an example of a frame structure in the TDMA/CDMA method.

The solution according to the invention can thus be implemented in radio systems employing a combined TDMA/CDMA method. In accordance with the multiple access method, signals are allocated in the time domain to time slots which are typically grouped into frames of predetermined dimensions. To provide service of good quality, each user must be given a time slot in which the actual signal-to-interference ratio is adequate to ensure the quality of the desired service. FIG. 1 illustrates an example of a frame structure in a TDMA/CDMA method. In the example of FIG. 1 the frame comprises eight time slots TS0, TS1, to TS7. In accordance with the principles of code division, signals of a plurality of terminals can be transmitted in each frame, each signal being coded with a spreading code that makes the distinction between signals possible at the receiving end. Co-channel interference is thus formed as a sum of several signals differentiated by codes. In FIG. 1 the first time slot TS0 of the frame comprises the signals 100 to 104 of three terminals. Correspondingly, the second time slot TS1 comprises the signal 106 of one terminal and the third time slot TS2 two signals 108 and 110.

Figure 2:
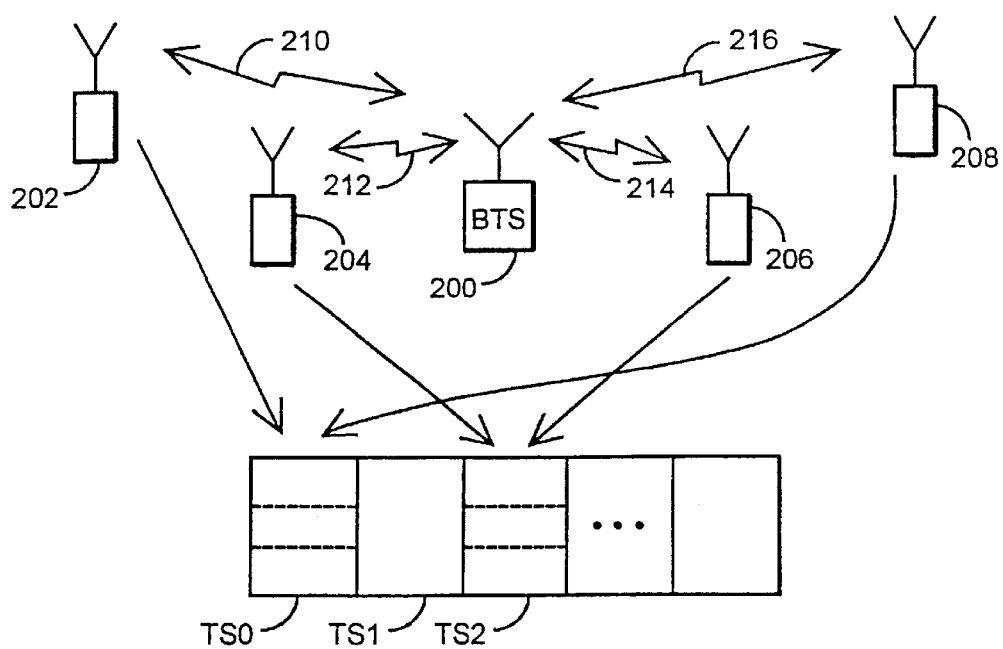
FIGS. 2 and 3 illustrate examples of allocating terminal signals to different time slots.

In the solution of the invention, transmissions of different terminals are grouped into different time slots on the basis of the connection characteristics of each terminal. In accordance with a preferred embodiment of the invention, terminal transmissions are grouped into power categories on the basis of the transmission power used in the downlink direction, and transmissions of terminals in each power category are allocated to the same time slots. In this solution the dynamics of power adjustment within a time slot remains small, and on the other hand, a base station may use power levels that vary distinctly in different time slots. This is illustrated in FIG. 2 showing a base station 200 with a plurality of terminals 202 to 208 within its coverage area. Connections 212, 214 of terminals 204, 206 located close to the base station may use lower power levels, and in accordance with the invention these are allocated to the same time slot, in the example of FIG. 2 to the time slot TS2. Accordingly, connections 210, 216 of terminals 202 and 208 located far from the base station, which connections have to use higher power levels than the above connections owing to greater path loss, are grouped to use the same time slot, in FIG. 2 the time slot TS0.

Transmissions are advantageously allocated to time slots in such a way that the difference in power levels of successive time slots is as small as possible, in order to avoid great unnecessary decreases and increases in power that cause disturbances.

In accordance with another preferred embodiment of the invention, the transmissions of terminals are grouped into different time slots on the basis of the transmission power level of each terminal. The maximum number of users in each time slot is limited on the basis of user power levels within one or more adjacent cells. In case the power levels are low, the number of users may be limited cell-specifically. In case the power levels used are high, in which case the risk of co-channel interference in the area of a neighbouring cell increases, the limitation of the number of users is effected between a plurality of adjacent cells. In that case a kind of timeslot-specific reuse configuration is concerned.

Figure 3:
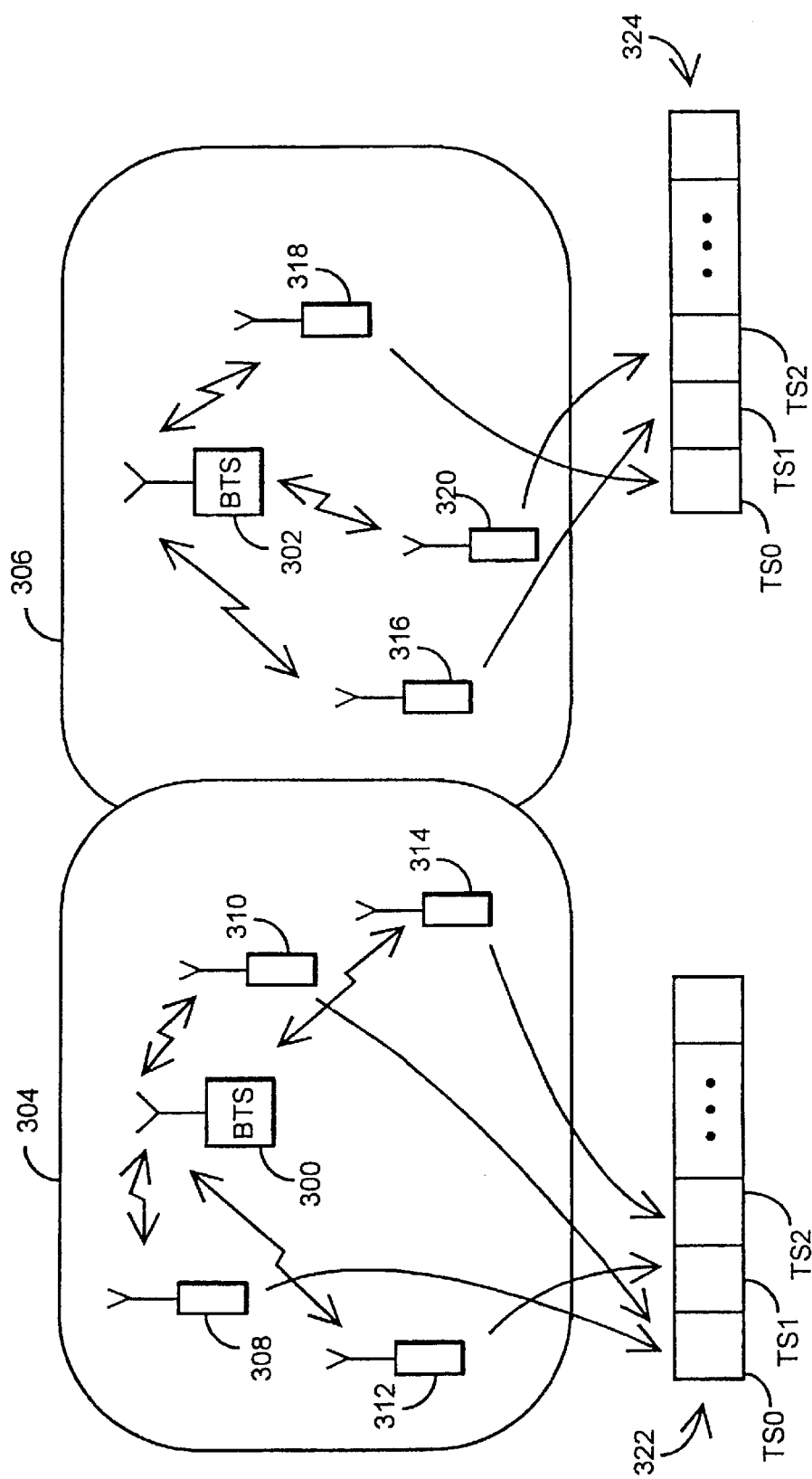

This embodiment is illustrated in FIG. 3 showing two base stations 300 and 302 with a plurality of terminals in their covering areas; terminals 308 to 314 in the coverage area 304 of the base station 300, and terminals 316 to 320 in the coverage area 306 of the base station 302. It is assumed that both base stations use the same frequency band. The figure illustrates the frame structure 322, 324 used by each base station. The base station 300 allocates the terminals 308, 310, close to the base station and thus using low transmission power, to the time slot TS0. Similarly, the base station 302 allocates the nearby terminal 318 using low transmission power to the same time slot TS0. Terminals 312 and 314, located farther away using high transmission power, to the time slots TS1 and TS2. Similarly, the base station 302 allocates the terminals 316 and 320 located farther away to the time slots TS1 and TS2. Terminals in adjacent cells and using low transmission power can all be allocated to the same time slot, since the transmissions in adjacent cells do not interfere with each other owing to their low transmission power. The number per time slot of terminals using higher transmission power must be limited in each cell in order for the co-channel interference not to increase excessively.

By grouping the terminals into different time slots on the basis of their power levels the co-channel interference can thus be reduced. Without grouping, all codes on the same channel would have to be sent within limited power dynamics. In that case a user requiring the highest power would determine the entire downlink transmission power to all codes in a dynamic range. As a consequence, the codes at the disposal of users close to the base station would also cause unnecessary co-channel interference in adjacent cells.

The invention can also preferably be applied to systems where some terminals use discontinuous transmission which aims at decreasing co-channel interference in radio systems. Discontinuous transmission relates to a method in which a transmitter sends a signal only when there is information to be transmitted, and at other times a signal is not sent. For example, when transmitting speech the transmitter is silenced when the user is not speaking. In TDMA systems the advantage of discontinuous transmission can not necessarily be benefited to the full, because when the transmission is on, the interference level it produces is nevertheless too high. In accordance with a preferred embodiment of the invention, transmissions of terminals using discontinuous transmission are grouped into the same time slots, and transmissions of terminals using continuous transmission into time slots of their own. Hence the advantage of discontinuous transmission can be utilized better than before. When the same time slot is allocated to several spreading code users, the interference level caused by users decreases more steadily owing to discontinuous transmission, since when the number of users increases, the ratio of interference caused by one user to the total interference decreases.

The invention can advantageously be applied also to systems having both circuit switched and packet switched services. Like in discontinuous transmission, the advantage to be gained with packet transmissions can be utilized better in the solution of the invention, in which signals of terminals employing circuit switched services are grouped into the same time slots and transmissions of terminals employing packet switched services into time slots of their own.

When the grouping into different time slots is effected, the minimization of mutual interference of different cell levels of hierarchical cells can also be taken into account. Thus micro cell users can be allocated to the same time slot, as can macro and pico cell users.

The invention can also be applied in such a way that when grouping users into different time slots, the channel coding used is considered when limiting the maximum number of users transmitting in each time slot. When using more efficient channel coding, more transmissions can be allowed in the same time slot than when using less efficient channel coding.

When grouping users into different time slots, the maximum number of users in each time slot can be increased temporarily, for example for signalling, since it can be assumed that error correction algorithms used on connections will manage temporary disturbances caused by a temporary increase in the number of users.

The invention can also preferably be applied to systems offering both mobile subscriber connections and fixed radio subscriber connections. Fixed radio subscriber connections are connections in which a terminal employing radio link is located in a fixed position. In accordance with a preferred embodiment of the invention, transmissions of fixed terminals are grouped into the same time slots and transmissions of mobile terminals into time slots of their own. Within time slots comprising different terminal types, groupings can naturally be effected according to other embodiments of the invention.

Even though the invention has been described in the above with reference to examples in accordance with the attached drawings, it is obvious that the invention is not restricted to them but can be modified in a variety of ways within the scope of the inventive idea disclosed in the appended claims.

What is claimed is:

1. A channel allocation method in a radio system comprising at least one base station in communication with a plurality of terminals within a coverage area of the at least one base station, at least one terminal of the plurality of terminals being configured to use discontinuous transmission and at least one terminal of the plurality of terminals being configured to use continuous transmission, the method comprising:

allocating air interface resources to different terminals of the plurality of terminals with a combined time and code multiple access method such that a signal of at least one terminal is transmitted in each time slot; and grouping the terminal signals into different time slots based on connection characteristics of each terminal, the grouping comprising grouping terminal signals employing discontinuous transmission into a first group of selected time slots and grouping transmissions of signals employing continuous transmission into a second group of selected time slots.

2. A channel allocation method in a radio system comprising at least one base station in communication with a plurality of terminals within a coverage area of the at least one base station, the radio system comprises circuit switched services and packet switched services, the method comprising:

allocating air interface resources to different terminals with a combined time and code multiple access method such that a signal of at least one terminal is transmitted in each time slot; and grouping the terminal signals into different time slots based on connection characteristics of each terminal, the grouping comprising grouping terminal signals employing circuit switched services into a first group of selected time slots and grouping transmissions of signals employing packet switched services into a second group of selected time slots.

3. A method as claimed in claim 1, further comprising grouping the terminal signals into power categories based on transmission power used in a downlink direction, and allocating transmissions of terminals in each power category to the first group of selected time slots.

4. A method as claimed in claim 1, further comprising grouping terminal signals into different time slots based on the transmission power of each terminal.

5. A method as claimed in claim 4, further comprising grouping signals of terminals transmitting with an equal power into the first group of selected time slots.

6. A method as claimed in claim 1 or 4, further comprising grouping terminal signals into different time slots based on the at least one basestation serving the respective terminal.

7. A method as claimed in claim 1 or 4, wherein connection characteristics of terminals located within a coverage area of a plurality of base stations are considered during the grouping.

8. A method as claimed in claim 1 or 4, wherein channel coding is considered during the grouping.

9. A method as claimed in claim 1 or 4, further comprising minimizing power differences between successive time slots during the grouping.

10. A method as claimed in claim 1 or 4, wherein the allocating employs a frequency multiple access method such that an availability of a neighboring channel is considered during the grouping depending on whether low or high power users are allocated to a particular time slot.

11. A radio system comprising:

a plurality of terminals having at least one fixed terminal and having at least one mobile terminal; and at least one base station in communication with the plurality of terminals within a coverage area of the at least one base station, the at least one base station being configured to use a combined time and code multiple access method to transmit signals of at least one terminal of the plurality of terminals in each time slot, the base station being configured to group terminal signals into different time slots based on connection characteristics of each terminal such that the base station is configured to group a signal of the at least one fixed terminal into a first group of selected time slots and the base station is configured to group a signal of the at least one mobile terminal into a second group of selected time slots.

12. A system as claimed in claim 11, wherein the base station is configured to group terminal signals into power categories based on transmission power used in a downlink direction, and wherein the base station allocates transmissions of each power category to the first group of selected time slots.

13. A system as claimed in claim 11, wherein connection characteristics of terminals located within a coverage area of a plurality of base stations are considered by the at least one base station when grouping the terminal signals.

* * * * *